United States Patent [19]

Spinner, deceased et al.

[11] Patent Number: 4,918,785

[45] Date of Patent: Apr. 24, 1990

[54] MECHANICAL KNOT FOR ROPES

[76] Inventors: Raphael F. Spinner, deceased, late of R.R. 3, Hillsboro, Ill. 62049; Clement F. Marley, R.R. 2, Box 165, Nokomis, Ill. 62075

[21] Appl. No.: 321,579

[22] Filed: Mar. 10, 1989

Related U.S. Application Data

[63] Continuation-in-part of Ser. No. 113,468, Oct. 27, 1987, Pat. No. 4,872,240.

[51] Int. Cl.$^5$ .......................... B65H 69/04; D03J 3/00
[52] U.S. Cl. .................. 16/114 B; 24/136 L; 289/1.5; 289/17; 43/42.49
[58] Field of Search ............ 16/114 B, 202–209; 24/115 H, 115 K, 115 R, 117, 129 R, 130, 136 L; 43/4, 42.49, 43.1, 44.83, 44.98; 289/1.5, 12–15, 17, 18.1

[56] References Cited

U.S. PATENT DOCUMENTS

| | | | |
|---|---|---|---|
| 749,847 | 1/1904 | Curtis | 24/130 |
| 1,452,338 | 4/1923 | Flowers | 24/130 |
| 1,718,641 | 6/1929 | Forman | 24/129 R |
| 2,595,806 | 5/1952 | Morris | 24/115 R |
| 4,785,509 | 11/1988 | Fisher | 24/129 R |

FOREIGN PATENT DOCUMENTS 614564  6/1935  Fed. Rep. of Germany ........ 24/130

Primary Examiner—Nicholas P. Godici
Assistant Examiner—Edward A. Brown

[57] ABSTRACT

The mechanical knot for ropes is a device to replace the time-honored metal hook and the conventional knots now used on tow and hoist ropes, and also tethering ropes. The device comprises a length of pipe or tube with an elongated slotted portion or portions in the walls, or a base plate with an elongated slot in it, and with right angle shoulders, each of which has a hole in it. Several methods of manufacture may be used in forming the device from various appropriate materials, including, but not limited to, milling, casting, extruding and bending. Strain on the rope secures the mechanical knot in place. When tension is relaxed, the rope can be easily untied. Should the rope break under strain, it will snap free of the mechanical knot device instantly, thus permitting the device to drop free from the rope. When it is desired to use a rope without the mechanical knot, it simply is slid off the rope.

4 Claims, 1 Drawing Sheet

MECHANICAL KNOT FOR ROPES

BACKGROUND OF THE INVENTION

This invention is a continuation-in-part and it relates to improvements on a steel knot for cables or ropes, now called a mechanical knot by the inventors. The parent application was filed under U.S. Ser. No. 113,468, now U.S. Pat. No. 4,872,240, filed Oct. 27, 1987 by the present applicants.

The parent invention generally discloses a steel device to replace the time-honored common hook, the spliced-end loop, and the conventional knots used on tow ropes and hoist ropes of all kinds for towing and lifting, and tethering loads of all kinds.

As indicated in the parent invention, the common open hook has long had several drawbacks and along with causing several dangers, also has caused certain inconveniences and annoyances. Now with the advent of newer ropes with more elasticity, the stress on ropes can be increased immensely resulting in even more danger of breaking hooks. Those broken hooks have resulted in high speed backlash which sends ropes with broken hooks in the opposite direction in a highly dangerous fashion, and many times in the death or serious injury to persons, and also damage to property.

Furthermore, the common hook also has been the cause of inconvenience and annoyance because it easily unhooks itself with alternating tensioning and slackening caused by variations in load pressures.

Also, conventional knots in stretchable rope tend to become excessively tight when under tension causing the rope to narrow in diameter. Ropes tied under such tension cannot be untied and must be cut.

Still another advantage of the mechanical knot is that it can be slid off the rope easily for when the rope is used without a hook. Reattaching the mechanical knot is then just a matter of rethreading it.

The mechanical knot is neither a conventional knot nor a hook, but it replaces both.

The parent invention disclosed a limited number of embodiments. Continuing research by the inventors indicates a need to include materials other than steel and embodiments other than those disclosed and claimed in the parent patent.

Research done on the parent steel knot had indicated a need for a relatively heavy device made of steel rings and unevenly spaced parallel steel bars attached to the rings at their ends.

Subsequent research into the desired materials to be used was influenced by an expanded number of prospective applications to which the mechanical knot might be applied. Also there was an indication that some of these applications did not necessarily require the strength of steel because the knot would be used as much or more for convenience than to withstand all-out stress. For example, the tying of livestock in one instance or mooring of light pleasure boats in another would be just a couple of examples where the convenience of the mechanical knot would be ideal with nylon or other synthetic ropes and would be more of a consideration than maximum stress on the ropes.

In such instances, mechanical knots made of plastic, metals other than steel, or other man-made substances will suffice.

In addition to constructing the mechanical knot of materials other than steel, and also simplified and more economical methods of manufacture are indicated.

Mechanical knots may be milled from plastic steel, or other tubing materials or can be cast or molded.

Mechanical knots also may be shaped from bent flat metal or molded in that design.

SUMMARY OF THE INVENTION

There are several objects to the continuation of the mechanical knot for ropes invention. One such object is to disclose the use of plastics, the use of plastic pipe, the use of steel pipe, or metals other than steel, and any new and useful material that may be developed in manufacturing mechanical knots.

Another object of the invention is to disclose and claim mechanical knots milled from or otherwise made from plastic or metal pipe, or which are molded or cast in similar shapes.

DESCRIPTION OF PREFERRED EMBODIMENT

Figure 1:
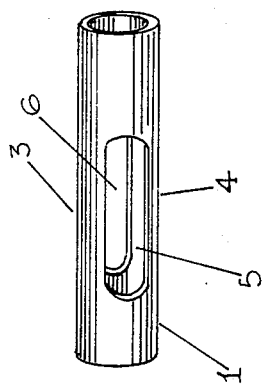
FIG. 1 illustrates a first embodiment of the mechanical knot of the present invention.

Referring now to the drawings, FIG. 1 illustrates a one-piece hollow cylindrical member 1 consisting of a length of tube or pipe containing longitudinal openings equal in length to from about two to four diameters of the cable or rope or cylinder and separated by about 180 degrees and connected by portions 3 and 4 so as to form slots 5 and 6. The mechanical knot is either milled from plastic or metal pipe or cast or molded from such materials. The two elongated slots in the cylinder's wall are positioned approximately 180 degrees apart from each other. The overall length of the mechanical knot may vary so long as it retains enough body to withstand the pressure produced by the rope under strain.

Figure 2:
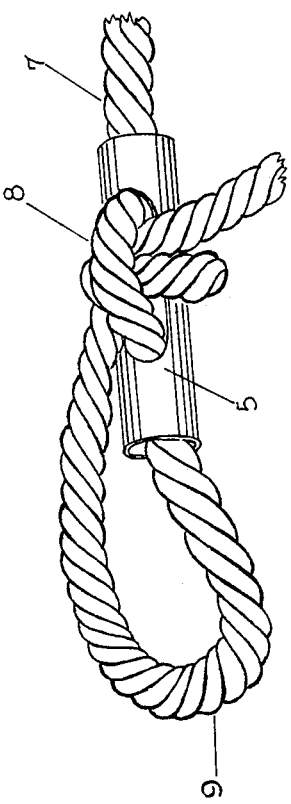
FIG. 2 illustrates how a knot is formed using the mechanical device of FIG. 1.

In accordance with the invention FIG. 2 illustrates mechanical knot 1 with rope 7 threaded through both of its ends. A portion of the rope 7 is pushed out from one of the slots 5 to form a catchment 8. Rope 7 then is formed into a loop 9 which is connected to a load and the end of rope 7 is threaded under catchment 8 and wound about the mechanical knot 1 and is slipped a second time under catchment 8 to form the finished knot. The mechanical device is held in position regardless of whether or not tension is applied.

Figure 3:
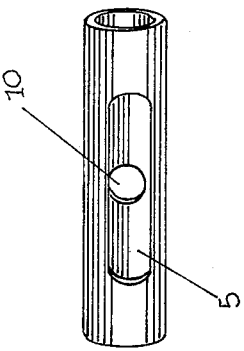
FIG. 3 illustrates a variation of the mechanical knot of FIG. 1.

FIG. 3 is a variation of the mechanical knot 1 as described in FIG. 1. It has one slot 5 equal in length to from about two to four diameters of the cable or rope or cylinder in one wall and a smaller finger hole 10 indicated by the dotted line in the opposite wall. The two openings are separated by about 180 degrees. Another variation of mechanical knot 1 may be formed with only a single slot for the rope catchment 8.

Figure 4:
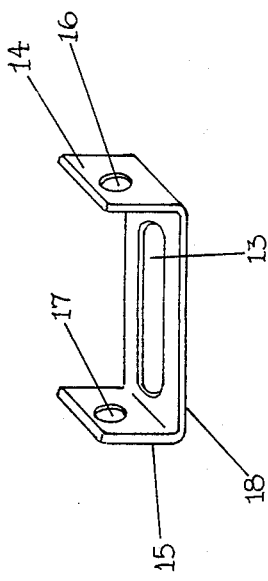
FIG. 4 is a second embodiment of the mechanical knot.

FIG. 4 is another embodiment 18 of the mechanical knot. It consists of a plate-like rectangular base portion with an elongated slot at 13 equal in length to from about two to six diameters of the cable or rope, and with right angle 14 and 15 formed at each longitudinal end of the plate-like portion and with holes 16 and 17. The rope or cable is threaded through each hole 16 and 17 to form the knot. Embodiment 18 can also constructed from metal or plastic by bending or molding.

Figure 5:
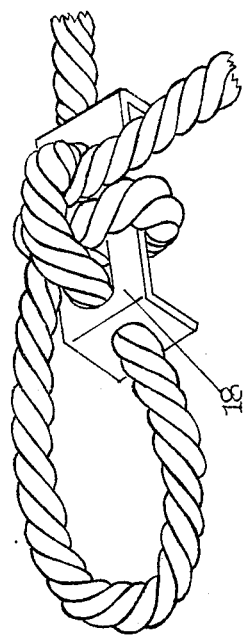
FIG. 5 illustrates how a knot is formed in the mechanical device of FIG. 4.

FIG. 5 indicates how rope 7 is threaded through holes 16 and 17 and how a rope catchment 8 is pushed out of the base portion through slot 13 then wound about the mechanical knot 18 and is finally threaded a second time under catchment 8 to form the knot. Again, tension is not required to hold the device 18 in place on the cable or rope.

Figure 6:
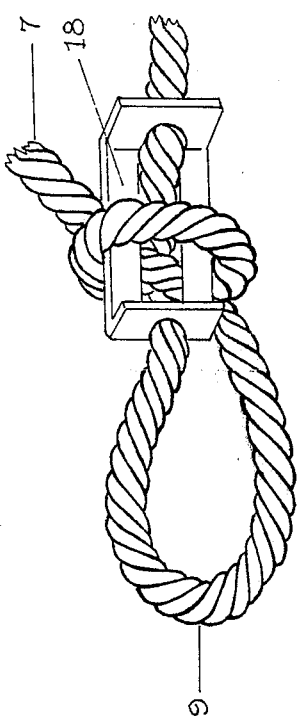
FIG. 6 illustrates the reverse side of the mechanical knot of FIG. 5.

FIG. 6 is a view of the opposite side of mechanical knot 18 illustrated in FIG. 5 showing how rope 7 is threaded through and about the device to form the loop 9 and the knot.

What is claimed is:

1. In combination, a cable or rope and a device for tying a knot in the cable or rope to form a first loop for connection to a load, the device comprising:
   a hollow metal or plastic cylinder of uniform diameter along its entire length and having at least one longitudinal opening equal in length to from about two to four diameters of the cable or rope or cylinder;
   wherein an end of the cable or rope is threaded through the device and a portion is pushed out of the device through the longitudinal opening to form a second loop, the end of the cable or rope is wound at least once about the device and is threaded with each winding through the second loop forming the knot.

2. The combination of claim 1 having two said longitudinal openings that are separated by about 180 degrees.

3. The combination of claim 1 having a first opening equal in length to from about two to four diameters of the cable or rope or cylinder, and a second smaller opening separated by about 180 degrees from the first opening.

4. In combination, a cable or rope and a device for tying a knot in the cable or rope to form a first loop for connection to a load, the device comprising:
   a rectangular plastic or metal plate-like base portion having a longitudinal opening equal in length to from about two to six diameters of the cable or rope, a plate-like shoulder formed perpendicular to each longitudinal end of said base portion in the same direction, each shoulder enclosing a hole;
   wherein an end of the cable or rope is threaded through said holes and a portion is pushed out of the base portion through the longitudinal opening to form a second loop, the end of the cable or rope is wound at least once about the base portion and is threaded with each winding through the second loop forming the knot.

* * * * *